US009392081B2

(12) United States Patent
Lin et al.

(10) Patent No.: US 9,392,081 B2
(45) Date of Patent: Jul. 12, 2016

(54) METHOD AND DEVICE FOR SENDING REQUESTS

(71) Applicant: Tencent Technology (Shenzhen) Company Limited, Shenzhen, Guangdong (CN)

(72) Inventors: Yanmiao Lin, Guangdong (CN); Shan Liu, Guangdong (CN); Yu Xu, Guangdong (CN); Dexian Chen, Guangdong (CN); Li Kong, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/786,308

(22) PCT Filed: Sep. 18, 2014

(86) PCT No.: PCT/CN2014/086823
§ 371 (c)(1),
(2) Date: Oct. 22, 2015

(87) PCT Pub. No.: WO2015/043413
PCT Pub. Date: Apr. 2, 2015

(65) Prior Publication Data
US 2016/0080529 A1 Mar. 17, 2016

(30) Foreign Application Priority Data
Sep. 30, 2013 (CN) .......................... 2013 1 0465637

(51) Int. Cl.
*G06F 15/16* (2006.01)
*H04L 29/06* (2006.01)
*H04L 29/08* (2006.01)

(52) U.S. Cl.
CPC .............. *H04L 69/163* (2013.01); *H04L 67/02* (2013.01); *H04L 67/42* (2013.01); *H04L 69/14* (2013.01); *H04L 67/141* (2013.01); *Y02B 60/33* (2013.01)

(58) Field of Classification Search
USPC .................... 709/200, 203; 715/713; 370/236
See application file for complete search history.

(56) References Cited

U.S. PATENT DOCUMENTS 8,224,966 B2 7/2012 Tate et al.
8,756,178 B1 * 6/2014 Bruckhaus .............. G06N 7/02 706/13

(Continued)

FOREIGN PATENT DOCUMENTS

CN 101771695 A 7/2010
CN 102111403 A 6/2011

(Continued)

OTHER PUBLICATIONS

Written Opinion and International Search Report for PCT/CN2014/086823 dated Jan. 5, 2015.

*Primary Examiner* — Tammy Nguyen
(74) *Attorney, Agent, or Firm* — Brinks Gilson & Lione

(57) ABSTRACT

A method for sending requests includes: determining, by a device comprising a processor, the requests and Transmission Control Protocol (TCP) connections between a client and a proxy server; and sending, by the device, the requests to the proxy server via idle TCP connections between the client and the proxy server to forward the requests to a Web server by the proxy server, or establishing, by the device, TCP connections between the client and the proxy server depending on whether the requests are serial or parallel requests, the number of the idle TCP connections between the client and the proxy server, and the number of TCP connections which are needed during sending the requests; and sending, by the device, the requests to the proxy server via the idle TCP connections and the established TCP connections to forward the requests to the Web server by the proxy server.

10 Claims, 4 Drawing Sheets

(56) References Cited

U.S. PATENT DOCUMENTS

2005/0027788 A1* 2/2005 Koopmans .............. H04L 67/32 709/200
2010/0281364 A1* 11/2010 Sidman ............. G06F 17/30595 715/713
2010/0293221 A1* 11/2010 Sidman ............. G06F 17/30855 709/203
2015/0012257 A1* 1/2015 Backholm ............. H04L 41/145 703/13
2015/0039442 A1* 2/2015 Sidman ............. G06F 17/30899 705/14.66
2016/0057654 A1* 2/2016 Backholm ......... H04W 28/0289 370/236
2016/0080529 A1* 3/2016 Lin ......................... H04L 67/02 709/203

FOREIGN PATENT DOCUMENTS

CN 102333081 A 1/2012
CN 102907071 A 1/2013
TW 201246873 A 11/2012

* cited by examiner

METHOD AND DEVICE FOR SENDING REQUESTS

CROSS-REFERENCE TO RELATED APPLICATIONS

This application is a national phase application of PCT/CN 2014/086823, filed on Sep. 18, 2014, which claims priority to a Chinese Patent Application No. 201310465637.3, filed on Sep. 30, 2013, the contents of which are incorporated by reference in the entirety.

FIELD

The present disclosure relates to Internet communication field, and more particularly to a method and a device for sending requests.

BACKGROUND

With the rapid development of Internet as well as the increase of the network size and the data amount, the efficient data access between the client and the server has become a new trend of the Internet. Typically, the data access includes the processes in which the client sends requests to the server.

In the conventional approaches, when the client needs to access to one data server, it first establishes the Transmission Control Protocol (TCP) connection with a proxy server, then the proxy server establishes the TCP connection with the data server. The client sends the requests to the proxy server via the TCP connection, subsequently, the proxy server forwards the requests to the data server via the TCP connection. Then the data server obtains responses according to the requests, and sends the responses to the proxy server via the TCP connection. The proxy server forwards the responses to the client via the TCP connection.

In general, every time the client accesses to the data server, it needs to establish the TCP connection with the proxy server, which is time consuming, resulting in low efficiency of data transmitting.

SUMMARY

In order to improve the data transmitting efficiency, the present disclosure provides a method and a device for sending requests.

In one aspect, the method comprises: determining, by a device comprising a processor, the requests and Transmission Control Protocol (TCP) connections between a client and a proxy server; and sending, by the device, the requests to the proxy server via idle TCP connections between the client and the proxy server so as to forward the requests to a Web server by the proxy server, if the requests are serial requests and the idle TCP connections exist between the client and the proxy server, or if the requests are serial requests and the number of idle TCP connections between the client and the proxy server is larger than or equal to the number of TCP connections which are needed during sending the requests; or establishing, by the device, TCP connections between the client and the proxy server according to the number of idle TCP connections between the client and the proxy server, and the number of TCP connections which are needed during sending the requests, if the requests are parallel requests and the number of idle TCP connections between the client and the proxy server is smaller than the number of TCP connections which are needed during sending the requests; and sending, by the device, the requests to the proxy server via the idle TCP connections between the client and the proxy server and the established TCP connections so as to forward the requests to the Web server by the proxy server.

In another aspect, a device for sending requests comprises: a determining module configured to determine the requests and TCP connections between the client and a proxy server; a first sending module configured to send the requests to the proxy server via idle TCP connections between the client and the proxy server so as to forward the requests to the Web server by the proxy server if the requests are serial requests and there are idle TCP connections between the client and the proxy server, or if the requests are serial requests and the number of idle TCP connections between the client and the proxy server is larger than or equal to the number of TCP connections which are needed during sending the requests; and a second sending module configured to establish the TCP connections between the client and the proxy server according to the number of idle TCP connections between the client and the proxy server and the number of TCP connections which are needed during sending the requests; and to send the requests to the proxy server via the idle TCP connections between the client and the proxy server and the established TCP connections so as to forward the requests to the Web server by the proxy server, if the requests are parallel requests and the number of idle TCP connections between the client and the proxy server is smaller than the number of TCP connections which are needed during sending the requests.

In the embodiment of the present disclosure, the requests are sent via the idle TCP connection between the client and the proxy server, thus the consumption of resources and time during establishing and disconnecting the TCP connections can be reduced, the data transmitting and receiving efficiency can be improved, and then a good user experience is brought.

BRIEF DESCRIPTION OF THE DRAWINGS

To explain the technical solutions of the embodiments of the present disclosure, accompanying drawings used in the embodiments are followed. Apparently, the following drawings merely illustrate some embodiments of the disclosure, but for persons skilled in the art, other drawings can be obtained without creative works according to these drawings.

DETAILED DESCRIPTION OF ILLUSTRATED EMBODIMENTS

Other aspects, features, and advantages of this disclosure will become apparent from the following detailed description when taken in conjunction with the accompanying drawings.

Embodiment 1

Figure 1:
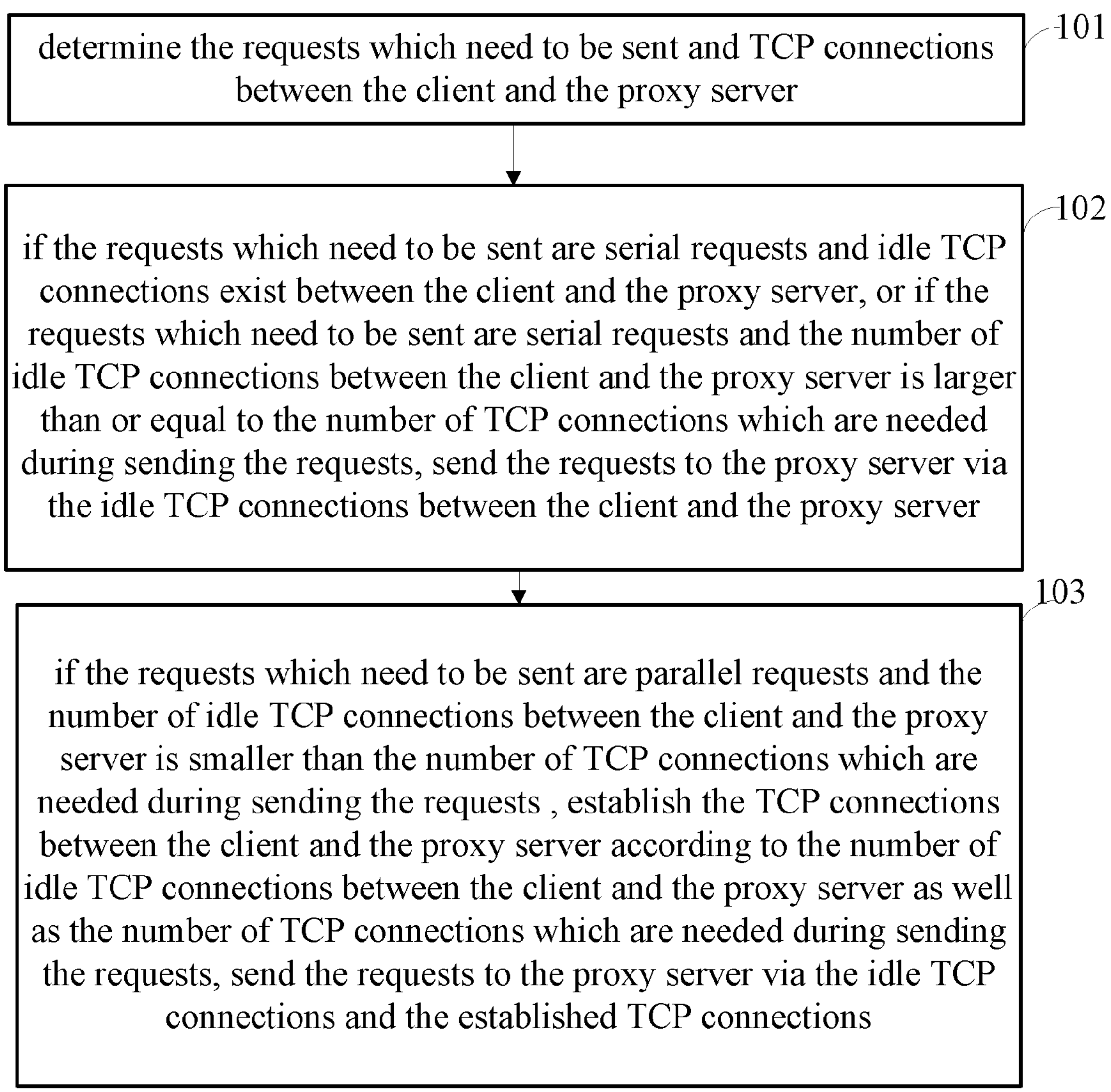
FIG. 1 is a flowchart of the method for sending requests according to the embodiment 1 of the present disclosure.

As shown in FIG. 1, the embodiment of the present disclosure provides a method for sending requests, which includes the following steps:

Step 101, determine the requests which need to be sent and TCP connections between the client and the proxy server;

Step 102, if the requests which need to be sent are serial requests and idle TCP connections exist between the client and the proxy server, or if the requests which need to be sent are serial requests and the number of idle TCP connections between the client and the proxy server is larger than or equal to the number of TCP connections which are needed during sending the requests which need to be sent, send the requests to the proxy server via the idle TCP connections between the client and the proxy server so as to make the proxy server forward the requests to a Web server; and Step 103, if the requests which need to be sent are parallel requests and the number of idle TCP connections between the client and the proxy server is smaller than the number of TCP connections which are needed during sending the requests which need to be sent, establish the TCP connections between the client and the proxy server according to the number of idle TCP connections between the client and the proxy server as well as the number of TCP connections which are needed during sending the requests, send the requests to the proxy server via the idle TCP connections between the client and the proxy server as well as the established TCP connections so as to make the proxy server forward the requests to the Web server.

In the embodiment of the present disclosure, the requests are sent via the idle TCP connection between the client and the proxy server, thus the consumption of resources and time during establishing and disconnecting the TCP connections can be reduced, the data transmitting and receiving efficiency can be improved, and then a good user experience is brought.

Embodiment 2

Figure 2:
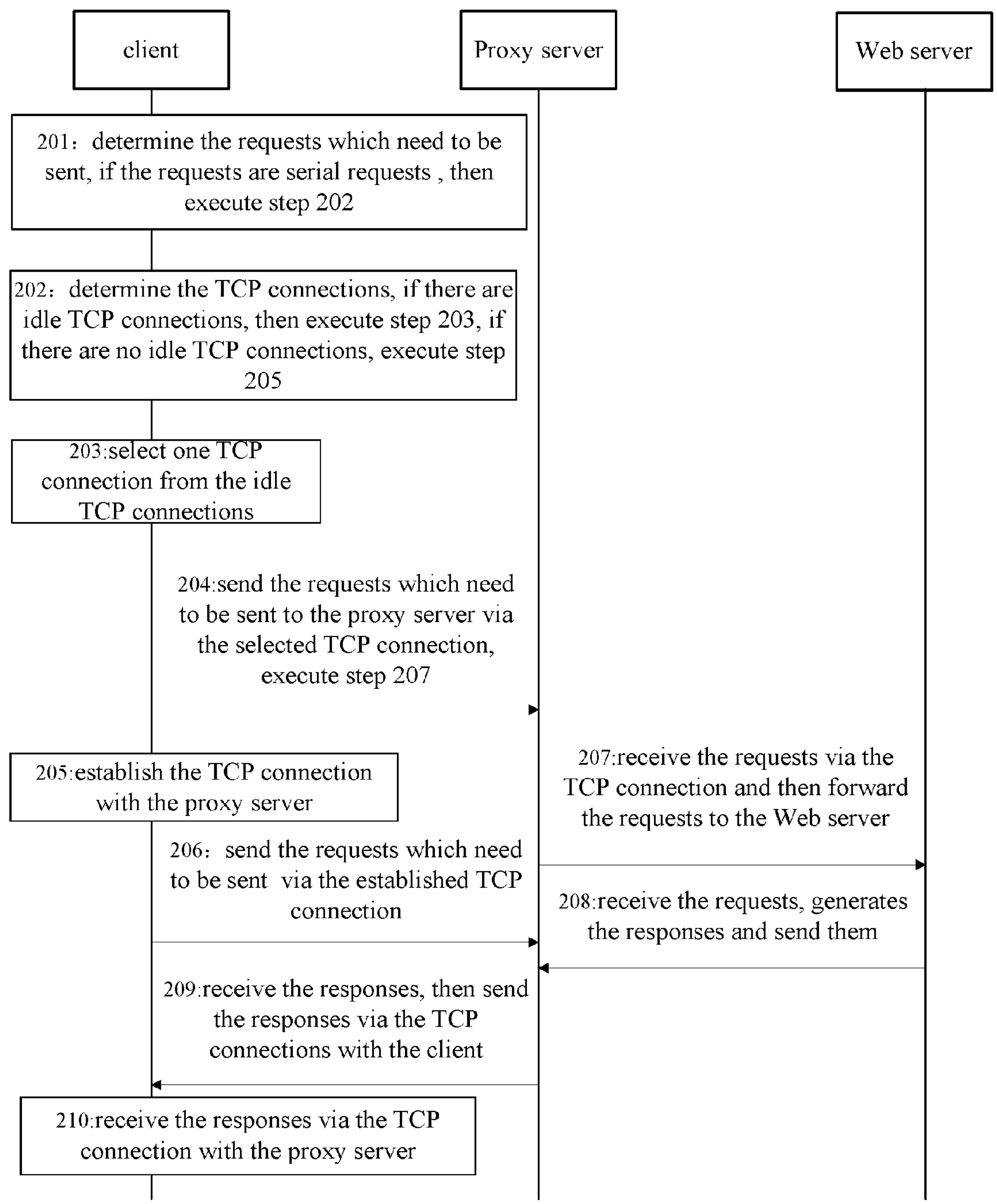
FIG. 2 is a flowchart of the method for sending requests according to the embodiment 2 of the present disclosure.

As shown in FIG. 2, the embodiment of the present disclosure provides a method for sending requests, which includes the following steps.

Step 201, the client determines the requests which need to be sent, if the requests which need to be sent are serial requests, then executes step 202.

Specifically, the client determines the type of requests, determining they are serial requests or parallel requests, if the requests are serial requests, executes step 202.

If the requests are parallel requests, execute the steps in the embodiment 3.

It only one TCP connection is needed to send the serial requests. The included data will be sent to the proxy server one by one, each data occupies a fixed time length.

The requests which need to be sent carry source address and destination address. The source address is the client address, and the destination address is the address of the Web server.

The source address and the destination address can be Media Access Control (MAC) address or Internet Protocol (IP) address.

Step 202, the client determines the TCP connections. If there are idle TCP connections, then executes step 203. If there are no idle TCP connections, executes step 205.

The corresponding relationship between the identification of the TCP connection and the TCP connection status stored in the client is used to store the identification of each TCP connection and each TCP connection status between the client and the proxy server.

Specifically, the client inquires the locally stored corresponding relationship between the identification of the TCP connection and the TCP connection status. If a record that the TCP connection status is idle is found, it demonstrates that there are idle TCP connections between the client and the proxy server, and that the TCP connections which are corresponding to the identification included in the record are idle TCP connections. If the record that the TCP connection status is idle is not found, it demonstrates that there are no idle TCP connections between the client and the proxy server.

Step 203, the client selects one TCP connection from the idle TCP connections.

Specifically, the client obtains the identification of idle TCP connections among the locally stored corresponding relationship between the identification of the TCP connection and the TCP connection status, then obtains idle TCP connections between the client and the proxy server according to the obtained identification of the TCP connections, and selects an idle TCP connection from the idle TCP connections between the client and the proxy server.

Further, the client sets the TCP connection status of the selected TCP connection as busy status in the locally stored corresponding relationship between the identification of the TCP connection and the TCP connection status.

Specifically, the client searches the corresponding TCP connection status from the locally stored corresponding relationship between the identification of the TCP connection and the TCP connection status according to the identification of the selected TCP connection, and sets the TCP connection status as busy status.

Step 204, the client sends the requests which need to be sent to the proxy server via the selected TCP connection, then executes step 207.

Specifically, the client serially sends the data included in the requests to the proxy server one by one via the selected TCP connection.

Step 205, the client establishes the TCP connection with the proxy server.

Specifically, the client establishes the TCP connections between the client and the proxy server according to the following steps 2051-2054.

Step 2051: The client sends a Synchronized (SYN) message to the proxy server, requesting to establish the TCP connections between the client and the proxy server.

Step 2052: The proxy server receives the SYN message sent by the client, and returns SYN+ACK (Acknowledge) message to the client.

Step 2053: The client receives the SYN+ACK message sent by the proxy server, and sends the ACK message to the proxy server.

Step 2054: The proxy server receives the ACK message sent by the client, thus the TCP connections between the client and the proxy server can be established.

Further, the client randomly generates identification for the established TCP connection.

Each identification corresponding to each TCP connection between the client and the proxy server is different.

Further, the client sets the TCP connection status as busy status, and stores the identification of the TCP connection and the TCP connection status in the corresponding relationship between the identification of the TCP connection and the TCP connection status.

Step 206, the client sends the requests which need to be sent to the proxy server via the established TCP connection.

Specifically, the client serially sends the data included in the requests to the proxy server one by one via the established TCP connection.

Step 207, the proxy server receives the requests via the TCP connection and then forwards the requests to the Web server.

Specifically, the proxy server serially receives each data included in the requests via the TCP connection, and sends the requests to the Web server according to the destination address, i.e., the address of the Web server carried in the requests.

The proxy server first establishes the TCP connection with the Web server, then sends the requests to the Web server via the established TCP connection according to the destination address, i.e., the address of the Web server carried in the requests.

Specifically, the proxy server can establish the TCP connection between the proxy server and the Web server via the following steps 2071-2074.

Step 2071: The proxy server sends a SYN message to the Web server, requests to establish the TCP connections between the client and the proxy server.

Step 2072: The Web server receives the SYN message sent by the proxy server, and returns SYN+ACK message to the client.

Step 2073: The proxy server receives the SYN+ACK message sent by the Web server, and sends the ACK message to the proxy server.

Step 2074: The Web server receives the ACK message sent by the proxy server, thus the TCP connections between the proxy server and the Web server can be established.

The proxy server sends the requests to the Web server via the established TCP connection.

Specifically, the proxy server serially sends the data included in the requests to the Web server one by one via the established TCP connection.

Step 208, the Web server receives the requests, and generates the responses and sends the responses to the proxy server.

Specifically, the Web server receives the requests sent by the proxy server via the TCP connection between the Web server and the proxy server, obtains the responses according to the requests, then sends the responses to the proxy server via the TCP connection.

The responses carry webpages, source address, and destination address. The source address is the client address, the destination address is the address of the Web server.

The source address and the destination address can be MAC address or IP address.

Further, the Web server sends the responses to the proxy server via the TCP connection.

Specifically, the Web server serially sends the data included in the responses to the proxy server one by one via the TCP connection.

Further, after sending the responses, the Web server disconnects the TCP connection.

Specifically, the Web server can disconnect the TCP connections between the Web server and the proxy server through the following steps 2081-2084.

Step 2081: The Web server sends a Finish (FIN) message to the proxy server, and requests to disconnect the TCP connections between the Web server and the proxy server.

Step 2082: The proxy server receives the FIN message sent by the Web server, and returns FIN+ACK message to the Web server.

Step 2083: The Web server receives the FIN+ACK message sent by the proxy server, and sends the ACK message to the proxy server.

Step 2084: The proxy server receives the ACK message sent by the Web server, thus the TCP connections between the proxy server and the Web server can be disconnected.

Step 209, the proxy server receives the responses sent by the Web server, and then sends the responses to the client via the TCP connections with the client.

Specifically, the proxy server serially receives each data included in the responses via the TCP connection with the Web server, then serially sends the data included in the responses to the client one by one via the TCP connection mentioned above according to the destination address, i.e., the address of the client carried by the responses.

Step 210, the client receives the responses via the TCP connection with the proxy server.

Specifically, the client serially receives each data included in the responses via the TCP connection with the proxy server.

Further, after receiving the responses, the client sets the status of the TCP connection which is used to transmit the responses as idle status in the locally stored corresponding relationship between the identification and status of the TCP connections.

Specifically, the client searches the corresponding TCP connection status in the locally stored corresponding relationship between the identification and status of the TCP connections according to the identification of the TCP connection which is used to transmit the responses, and then sets the TCP connection status as idle status.

After receiving the responses, the client sets the TCP connection status as idle status. Thus, after receiving the responses, the TCP connection can be used to send other messages, which improves the utilization rate of the TCP connection.

Further, while sending the responses, the proxy server also sends the instruction of not disconnecting the TCP connection which is in the idle status.

Moreover, the client receives the instruction and then maintains the idle TCP connection connected according to the instruction.

Furthermore, the client or the proxy server determines whether the continuous idle time of the TCP connection exceeds a preset time. If the continuous idle time of the TCP connection exceeds the preset time, the TCP connection is disconnected.

Specifically, the client or the proxy server obtains the identification of the TCP connection between the client and the proxy server which continuous idle time reaches the preset time, then disconnects the TCP connection corresponding to the obtained identification of the TCP connection.

The preset time can be 60 seconds or 120 seconds, etc.

Specifically, the client can disconnect the TCP connections between the client and the proxy server through the following steps 2101-2104.

Step 2101: The client sends a FIN message to the proxy server, requests to disconnect the TCP connections between the client and the proxy server.

Step 2102: The proxy server receives the FIN message sent by the client, and returns FIN+ACK message to the client.

Step 2103: The client receives the FIN+ACK message sent by the proxy server, and sends the ACK message to the proxy server.

Step 2104: The proxy server receives the ACK message sent by the client, thus the TCP connections between the client and the proxy server can be disconnected.

Furthermore, the client and the proxy server delete the identification and the connection status of the TCP connection in the locally stored corresponding relationship between the identification of the TCP connection and the TCP connection status.

In the embodiment of the present disclosure, the requests are sent via the idle TCP connection between the client and the proxy server. Thus, the consumption of resources and time during establishing and disconnecting the TCP connections can be reduced, the data transmitting and receiving efficiency can be improved, and then a good user experience is brought.

Embodiment 3

Figure 3:
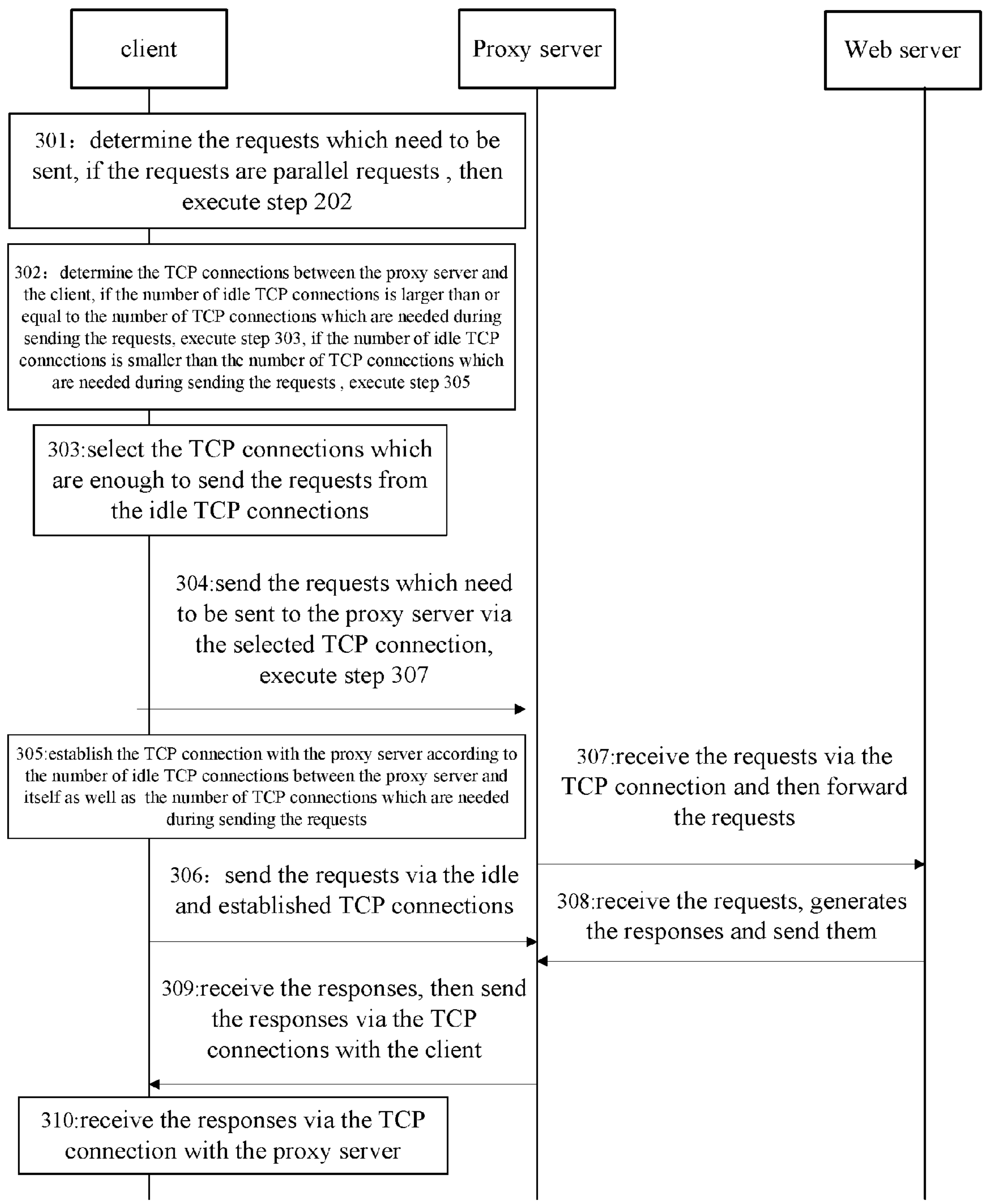
FIG. 3 is a flowchart of the method for sending requests according to the embodiment 3 of the present disclosure.

As shown in FIG. 3, the embodiment of the present disclosure provides a method for sending requests, which includes the following steps.

Step 301, the client determines the requests which need to be sent, if the requests which need to be sent are parallel requests, then executes step 302.

Specifically, the client determines the type of the requests which need to be sent, determining the requests are serial requests or parallel requests. If the requests are parallel requests, executes step 302.

If the requests are serial requests, execute the steps in the embodiment 2.

Multiple TCP connections are needed to send the parallel requests. All of the included data will be sent to the proxy server in the same time.

The requests which need to be sent carry source address and destination address. The source address is the client address, the destination address is the address of the Web server.

The source address and the destination address can be MAC address or IP address.

Step 302, the client determines the TCP connections between the proxy server and itself. If the number of idle TCP connections is larger than or equal to the number of TCP connections which are needed during sending the requests, step 303 is executed. If the number of idle TCP connections is smaller than the number of TCP connections which are needed during sending the requests which need to be sent, step 305 is executed.

The corresponding relationship between the identification of the TCP connection and the TCP connection status locally stored in the client is used to store the identification of each TCP connection and each TCP connection status between the client and the proxy server.

Specifically, the client calculates the number of TCP connections which are needed during sending the parallel requests, then inquires the locally stored corresponding relationship between the identification of the TCP connection and the TCP connection status. Then, the client finds a record that the TCP connection status is idle, counts the number of inquired records, which is equivalent to the number of idle connections between the client and the proxy server, and determines the number of idle TCP connections and the number of TCP connections which are needed during sending the requests.

If the number of idle TCP connections between the client and the proxy server is larger than or equal to the number of TCP connections which are needed during sending the requests, it demonstrates that there are enough idle TCP connections between the client and the proxy server. If the number of idle TCP connections between the client and the proxy server is smaller than the number of TCP connections which are needed during sending the requests, it demonstrates that there are not enough idle TCP connections between the client and the proxy server.

Step 303, the client selects enough TCP connections to send the requests from the idle TCP connections.

Specifically, the client obtains the identification of idle TCP connections among the locally stored corresponding relationship between the identification of the TCP connection and the TCP connection status, then obtains idle TCP connections between the client and the proxy server according to the obtained identification of the TCP connections. The client selects enough idle TCP connections from the idle TCP connections between the client and the proxy server.

Further, the client sets the TCP connection status as busy status in the locally stored corresponding relationship between the identification of the TCP connection and the TCP connection status.

Specifically, the client searches the corresponding TCP connection status from the locally stored corresponding relationship between the identification of the TCP connection and the TCP connection status according to the identification of the selected TCP connection, and sets the TCP connection status as busy status.

Step 304, the client sends the requests to the proxy server via the selected TCP connection, then executes step 307.

Specifically, the client sends all the data included in the requests to the proxy server in parallel in the same time via the selected TCP connection.

Step 305, the client establishes the TCP connection with the proxy server according to the number of idle TCP connections between the proxy server and itself as well as the number of TCP connections which are needed during sending the requests.

Specifically, the client calculates the number of TCP connections which need to be established according to the number of idle TCP connections between the proxy server and itself as well as the number of TCP connections which are needed during sending the requests, then establishes the TCP connection with the proxy server according to the number of TCP connections which need to be established.

The client can establish any one of the TCP connections between the client and the proxy server through the following steps 3051-3054.

3051: The client sends a SYN message to the proxy server, requests to establish the TCP connections between the client and the proxy server.

3052: The proxy server receives the SYN message sent by the client, and returns SYN+ACK message to the client.

3053: The client receives the SYN+ACK message sent by the proxy server, and sends the ACK message to the proxy server.

3054: The proxy server receives the ACK message sent by the client. Thus, the TCP connections between the client and the proxy server can be established.

Further, the client randomly generates identification for each established TCP connection.

Each identification corresponding to each TCP connection between the client and the proxy server is different.

Further, the client sets the TCP connection status as busy status, stores the identification of the TCP connection and the TCP connection status in the locally stored corresponding relationship between the identification of the TCP connection and the TCP connection status.

Step 306, the client sends the requests to the proxy server via the idle TCP connections and the established TCP connections.

Specifically, the client sends all the data included in the requests to the proxy server in parallel in the same time via the idle TCP connections and the established TCP connections.

Step 307, the proxy server receives the requests via the TCP connections and then forwards the requests to the Web server.

Specifically, the proxy server receives each data included in the requests in parallel via the TCP connection, and sends the requests to the Web server according to the destination address, i.e., the address of the Web server carried in the requests.

The proxy server first establishes the TCP connection with the Web server, then sends the requests to the Web server via the established TCP connection according to the destination address, i.e., the address of the Web server carried in the requests.

The proxy server establishes enough TCP connections between the Web server and itself according to the number of TCP connections which are needed during sending the requests.

Specifically, the proxy server can establish any of the TCP connections between the Web server and itself through the following steps 3071-3074.

3071: The proxy server sends a SYN message to the Web server, requests to establish the TCP connections between the client and the proxy server.

3072: The Web server receives the SYN message sent by the proxy server, and returns SYN+ACK message to the client.

3073: The proxy server receives the SYN+ACK message sent by the Web server, and sends the ACK message to the proxy server.

3074: The Web server receives the ACK message sent by the proxy server, thus the TCP connections between the proxy server and the Web server can be established.

The proxy server sends the requests to the Web server via the established TCP connection.

Specifically, the client sends all the data included in the requests to the Web server in parallel in the same time via the established TCP connections.

Step 308, the Web server receives the requests, generates the responses, and sends the responses to the proxy server.

Specifically, the Web server receives the requests sent by the proxy server via the TCP connections with the proxy server, obtains the responses according to the requests, then sends the responses to the proxy server via the TCP connections.

The responses carry webpage, source address, and destination address. The source address is the client address, the destination address is the address of the Web server.

The source address and the destination address can be MAC address or IP address.

Further, the Web server sends the responses to the proxy server via the TCP connection.

Specifically, the Web server sends all the data included in the responses to the proxy server in parallel in the same time via the TCP connection.

Further, after sending the responses, the Web server disconnects the TCP connection.

Specifically, the Web server can disconnect any one of the TCP connections between the Web server and the proxy server through the following steps 3081-3084.

Step 3081: the Web server sends a FIN message to the proxy server, and requests to disconnect the TCP connections between the Web server and the proxy server.

Step 3082: the proxy server receives the FIN message sent by the Web server, and returns FIN+ACK message to the Web server.

Step 3083: the Web server receives the FIN+ACK message sent by the proxy server, and sends the ACK message to the proxy server.

Step 3084: the proxy server receives the ACK message sent by the Web server. Thus the TCP connections between the proxy server and the Web server can be disconnected.

Step 309, the proxy server receives the responses sent by the Web server, and then sends the responses to the client via the TCP connections with the client.

Specifically, the proxy server receives each data included in the responses in parallel via the TCP connection with the Web server, then sends all the data included in the responses to the client in parallel via the TCP connection mentioned above according to the destination address, i.e., the address of the client carried by the responses.

Step 310: the client receives the responses via the TCP connections with the proxy server.

Specifically, the client receives each data included in the responses in parallel via the TCP connections with the proxy server.

Further, after receiving the responses, the client sets the status of the TCP connection which is used to transmit the responses as idle status in the locally stored corresponding relationship between the identification and status of the TCP connections.

Specifically, the client searches the corresponding TCP connection status in the locally stored corresponding relationship between the identification and status of the TCP connections according to the identification of the TCP connection which is used to transmit the responses, and then sets the TCP connection status as idle status.

After receiving the responses, the client sets the TCP connection status as idle status. Thus after receiving the responses, the TCP connection can be used to send other messages, which improves the utilization rate of the TCP connection.

Further, while sending the responses, the proxy server also sends the instruction of not disconnecting the TCP connection which is in the idle status.

Moreover, the client receives the instruction and then maintains the idle TCP connection connected according to the instruction.

Furthermore, the client or the proxy server determines whether the continuous idle time of the TCP connection exceeds a preset time. If the continuous idle time of the TCP connection exceeds the preset time, the client or the proxy server disconnects the TCP connection.

Specifically, the client or the proxy server obtains the identification of the TCP connection between the client and the proxy server which continuous idle time reaches the preset time, then disconnects the TCP connection corresponding to the obtained identification of the TCP connection.

The preset time can be 60 seconds or 120 seconds, etc.

Specifically, the client can disconnect any one of the TCP connections between the client and the proxy server through the following steps 3101-3104.

Step 3101: the client sends a FIN message to the proxy server, and requests to disconnect the TCP connections between the client and the proxy server.

Step 3102: the proxy server receives the FIN message sent by the client, and returns FIN+ACK message to the client.

Step 3103: the client receives the FIN+ACK message sent by the proxy server, and sends the ACK message to the proxy server.

Step 3104: the proxy server receives the ACK message sent by the client, thus the TCP connections between the client and the proxy server can be disconnected.

Furthermore, the client and the proxy server delete the identification and the connection status of the TCP connection in the locally stored corresponding relationship between the identification of the TCP connection and the TCP connection status.

In the embodiment of the present disclosure, the requests are sent via the idle TCP connection between the client and the proxy server. Thus, the consumption of resources and time during establishing and disconnecting the TCP connections can be reduced, the data transmitting and receiving efficiency can be improved, and then a good user experience is brought.

The embodiment 4

Figure 4:
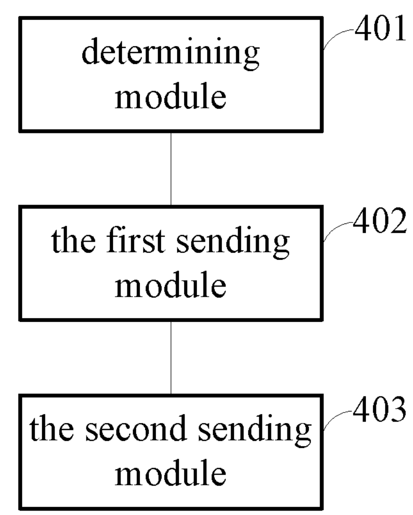
FIG. 4 is a structural schematic diagram of the device for sending requests according to the embodiment 4 of the present disclosure.

As shown in FIG. 4, the embodiment in the present disclosure provides a device for sending the requests, which comprises:

a determining module 401 configured to determine the requests which need to be sent and TCP connections between the client and the proxy server;

a first sending module 402 configured to send the requests to the proxy server via the idle TCP connections between the client and the proxy server so as to make the proxy server forward the requests to the Web server if the requests are serial requests and there are idle TCP connections between the client and the proxy server, or if the requests are serial requests and the number of idle TCP connections between the client and the proxy server is larger than or equal to the number of TCP connections which are needed during sending the requests; and a second sending module 403 configured to establish the TCP connections between the client and the proxy server according to the number of idle TCP connections between the client and the proxy server as well as the number of TCP connections which are needed during sending the requests and sending the requests to the proxy server via the idle TCP connections between the client and the proxy server as well as the established TCP connections so as to make the proxy server forward the requests to the Web server if the requests are parallel requests and the number of idle TCP connections between the client and the proxy server is smaller than the number of TCP connections which are needed during sending the requests.

In some embodiments, the device also comprises:

a first obtaining module configured to obtain the identification of the TCP connection which connection status is idle in the corresponding relationship between the identification of the TCP connection and the TCP connection status locally stored in the client; and a second obtaining module configured to obtain the TCP connection corresponding to the obtained identification of the TCP connection. The obtained TCP connection is an idle TCP connection between the client and the proxy server.

In some embodiments, the device also comprises a first setting module configured to set the TCP connection status corresponding to the obtained identification of the TCP connection as busy status in the corresponding relationship between the identification of the TCP connection and the TCP connection status stored in the client.

In some embodiments, the device further comprises a second setting module configured to set the connection status of the established TCP connection as busy status, and to store the identification and connection status of the established TCP connection in the corresponding relationship between the identification of the TCP connection and the TCP connection status stored in the client.

In some embodiments, the device further comprises a third setting module configured to set the TCP connection status of the TCP connection as idle status in the corresponding relationship between the identification of the TCP connection and the TCP connection status stored in the client after receiving the responses which are first sent from the Web server to the client and then forwarded by the proxy server via the TCP connection.

In some embodiments, the device further comprises a receiving module configured to receive the instruction for not disconnecting the TCP connection sent by the proxy server and then to maintain the TCP connection connected according to the instruction after receiving the responses which are first sent from the Web server to the client and then forwarded by the proxy server via the TCP connection.

In some embodiments, the device further comprises a third obtaining module configured to obtain the TCP connection between the client and the proxy server which continuous idle time reaches a preset time, and to disconnect the obtained TCP connection.

In some embodiments, the device further comprises a deleting module configured to delete the identification and the connection status of the obtained TCP connection in the corresponding relationship between the identification of the TCP connection and the TCP connection status stored in the client.

In the embodiment of the present disclosure, the requests are sent via the idle TCP connection between the client and the proxy server. Thus, the consumption of resources and time during establishing and disconnecting the TCP connections can be reduced, the data transmitting and receiving efficiency can be improved, and then a good user experience is brought.

Moreover, it is understood for a person skilled in the art to accomplish part of or whole steps in the embodiment mentioned above by instructing the related hardware with program. Such program can be stored in a computer-readable storage medium such as read-only memory, magnetic or optical disk, etc.

The sequence numbers of the above embodiments of the disclosure are only for the purpose of description, and do not represent one embodiment is superior to another.

While the disclosure has been described in connection with what are presently considered to be the most practical and preferred embodiments, it is to be understood that the disclosure is not to be limited to the disclosed embodiments, but on the contrary, is intended to cover various modifications and equivalent arrangements included within the spirit and scope of the invention.

The invention claimed is:

1. A method for sending requests, comprising:

determining, by a device comprising a processor, the requests and Transmission Control Protocol (TCP) connections between a client and a proxy server; and sending, by the device, the requests to the proxy server via idle TCP connections between the client and the proxy server so as to forward the requests to a Web server by the proxy server, if the requests are serial requests and the idle TCP connections exist between the client and the proxy server, and if the requests are serial requests and the number of idle TCP connections between the client and the proxy server is larger than or equal to the number of TCP connections which are needed during sending the requests; and establishing, by the device, TCP connections between the client and the proxy server according to the number of idle TCP connections between the client and the proxy server, and the number of TCP connections which are needed during sending the requests, if the requests are parallel requests and the number of idle TCP connections between the client and the proxy server is smaller than the number of TCP connections which are needed during sending the requests; and sending, by the device, the requests to the proxy server via the idle TCP connections between the client and the proxy server and the established TCP connections so as to forward the requests to the Web server by the proxy server, wherein before sending the requests to the proxy server via the idle TCP connections between the client and the proxy server, the method further comprises:

obtaining the identification of the idle TCP connection in a corresponding relationship between the identification of the TCP connections and a TCP connection status locally stored in the client; and obtaining the TCP connection corresponding to the obtained identification of the TCP connection, wherein the obtained TCP connection is an idle TCP connection between the client and the proxy server.

2. The method according to claim 1, wherein after obtaining the identification of the idle TCP connection, the method further comprises:

setting the TCP connection status corresponding to the obtained identification of the TCP connection as busy status in the corresponding relationship between the identification of the TCP connection and the TCP connection status locally stored in the client.

3. A method for sending requests, comprising:

determining, by a device comprising a processor, the requests and Transmission Control Protocol (TCP) connections between a client and a proxy server; and sending, by the device, the requests to the proxy server via idle TCP connections between the client and the proxy server so as to forward the requests to a Web server by the proxy server, if the requests are serial requests and the idle TCP connections exist between the client and the proxy server, and if the requests are serial requests and the number of idle TCP connections between the client and the proxy server is larger than or equal to the number of TCP connections which are needed during sending the requests; and establishing, by the device, TCP connections between the client and the proxy server according to the number of idle TCP connections between the client and the proxy server, and the number of TCP connections which are needed during sending the requests, if the requests are parallel requests and the number of idle TCP connections between the client and the proxy server is smaller than the number of TCP connections which are needed during sending the requests; and sending, by the device, the requests to the proxy server via the idle TCP connections between the client and the proxy server and the established TCP connections so as to forward the requests to the Web server by the proxy server, wherein after establishing the TCP connections between the client and the proxy server, the method further comprises:

setting the connection status of the established TCP connection as busy status; and storing the identification and connection status of the established TCP in the corresponding relationship between the identification of the TCP connection and the TCP connection status locally stored in the client.

4. A device for sending requests, comprising:

a determining module configured to determine the requests and Transmission Control Protocol (TCP) connections between a client and a proxy server;

a first sending module configured to send the requests to the proxy server via idle TCP connections between the client and the proxy server so as to forward the requests to a Web server by the proxy server if the requests are serial requests and there are idle TCP connections between the client and the proxy server, and if the requests are serial requests and the number of idle TCP connections between the client and the proxy server is larger than or equal to the number of TCP connections which are needed during sending the requests; and a second sending module configured to establish the TCP connections between the client and the proxy server according to the number of idle TCP connections between the client and the proxy server and the number of TCP connections which are needed during sending the requests, if the requests are parallel requests and the number of idle TCP connections between the client and the proxy server is smaller than the number of TCP connections which are needed during sending the requests, to send the requests to the proxy server via the idle TCP connections between the client and the proxy server and the established TCP connections so as to forward the requests to the Web server by the proxy server, wherein before sending the requests to the proxy server, a first obtaining module is configured to obtain the identification of the TCP connection which connection status is idle in the corresponding relationship between the identification of the TCP connection and the TCP connection status locally stored in the client; and a second obtaining module is configured to obtain the TCP connection corresponding to the obtained identification of the TCP connection, wherein the obtained TCP connection is an idle TCP connection between the client and the proxy server, wherein the modules comprise a processor and computer memory.

5. The device according to claim 4, wherein the device further comprises a first setting module configured to set the TCP connection status corresponding to the obtained identification of the TCP connection as busy status in the corresponding relationship between the identification of the TCP connection and the TCP connection status stored in the client.

6. The device according to claim 4, wherein the device further comprises a second setting module configured to set the connection status of the established TCP connection as busy status, and to store the identification and connection status of the established TCP connection in the corresponding relationship between the identification of the TCP connection and the TCP connection status stored in the client.

7. The device according to claim 4, wherein the device further comprises a third setting module configured to set the TCP connection status of the TCP connection as idle status in the corresponding relationship between the identification of the TCP connection and the TCP connection status stored in the client after receiving responses sent from the Web server to the client and forwarded by the proxy server via the TCP connection.

8. The device according to claim 4, wherein the device further comprises a receiving module configured to receive the instruction not to disconnect the TCP connection sent by the proxy server and to maintain the TCP connection according to the instruction after receiving the responses sent from the Web server to the client and forwarded by the proxy server via the TCP connection.

9. The device according to claim 4, wherein the device further comprises a third obtaining module configured to obtain the TCP connection between the client and the proxy server which continuous idle time reaches a preset time, and to disconnect the obtained TCP connection.

10. The device according to claim 9, wherein the device further comprises a deleting module configured to delete the identification and the connection status of the obtained TCP connection in the corresponding relationship between the identification of the TCP connection and the TCP connection status stored in the client.

* * * * *